US010415850B2

(12) United States Patent
Bailey

(10) Patent No.: US 10,415,850 B2
(45) Date of Patent: Sep. 17, 2019

(54) GAS FEED TUBE ASSEMBLY FOR A WATER HEATER

(71) Applicant: Haier US Appliance Solutions, Inc., Wilmington, DE (US)

(72) Inventor: Thomas Allen Bailey, Louisville, KY (US)

(73) Assignee: Haier US Appliance Solutions, Inc., Wilmington, DE (US)

(*) Notice: Subject to any disclaimer, the term of this patent is extended or adjusted under 35 U.S.C. 154(b) by 0 days.

(21) Appl. No.: 15/629,829

(22) Filed: Jun. 22, 2017

(65) Prior Publication Data
US 2018/0372374 A1 Dec. 27, 2018

(51) Int. Cl.
| F24H 9/18 | (2006.01) |
| F27B 7/36 | (2006.01) |
| F16L 5/00 | (2006.01) |
| F24H 9/00 | (2006.01) |
| F24H 1/20 | (2006.01) |
| F16L 15/08 | (2006.01) |
| F16L 5/12 | (2006.01) |
| F16L 19/10 | (2006.01) |

(52) U.S. Cl.
CPC ............. *F24H 9/0005* (2013.01); *F16L 5/12* (2013.01); *F16L 15/08* (2013.01); *F16L 19/10* (2013.01); *F24H 1/205* (2013.01)

(58) Field of Classification Search
CPC . F24H 1/00; F24H 9/124; F24H 1/186; F24H 9/18; F16L 41/08; F16L 41/12; F16L 5/00; F27B 7/36; F27B 5/16
See application file for complete search history.

(56) References Cited

U.S. PATENT DOCUMENTS

| 196,084 | A | * | 10/1877 | Guyer | F16L 19/04 |
| | | | | | 285/148.11 |
| 3,871,800 | A | * | 3/1975 | Slayton | F04B 39/123 |
| | | | | | 418/248 |
| 5,195,785 | A | * | 3/1993 | Jellison | F16L 15/08 |
| | | | | | 285/148.19 |
| 6,302,062 | B2 | * | 10/2001 | Overbey, Jr. | F24H 9/1836 |
| | | | | | 122/13.01 |
| 6,454,311 | B1 | * | 9/2002 | Berry | F16L 3/003 |
| | | | | | 248/65 |
| 6,517,344 | B2 | * | 2/2003 | Scanlon | F23K 5/007 |
| | | | | | 122/19.2 |
| 8,091,927 | B2 | * | 1/2012 | Scanlon | F23K 5/007 |
| | | | | | 285/136.1 |
| 8,596,226 | B2 | * | 12/2013 | McAnally | F23M 11/02 |
| | | | | | 122/17.1 |
| 2009/0084328 | A1 | * | 4/2009 | Lyons | F23C 7/02 |
| | | | | | 122/13.01 |
| 2009/0302603 | A1 | | 12/2009 | Clayton | |
| 2010/0101509 | A1 | | 4/2010 | Tanbour et al. | |

(Continued)

*Primary Examiner* — Gregory A Wilson
(74) *Attorney, Agent, or Firm* — Dority & Manning, P.A

(57) ABSTRACT

A gas feed tube assembly for a gas fueled water heater and a water heater including such assembly. A pair of gas tubes are connected with one tube received into the other and secured between a pair of complementary fasteners position along a wall or door the water heater. The gas feed tube assembly can be more readily manufactured, facilitates installation of the water heater, and helps minimize gas leaks.

20 Claims, 8 Drawing Sheets

(56) References Cited

U.S. PATENT DOCUMENTS

| | | | |
|---|---|---|---|
| 2010/0101510 A1* | 4/2010 | Tanbour | F23M 5/025 |
| | | | 122/19.2 |
| 2011/0083618 A1* | 4/2011 | O'Donnell | F23C 5/02 |
| | | | 122/17.1 |
| 2016/0138827 A1* | 5/2016 | Lesage | F24H 8/00 |
| | | | 122/18.31 |
| 2018/0142922 A1* | 5/2018 | Knoeppel | F24H 1/186 |

* cited by examiner

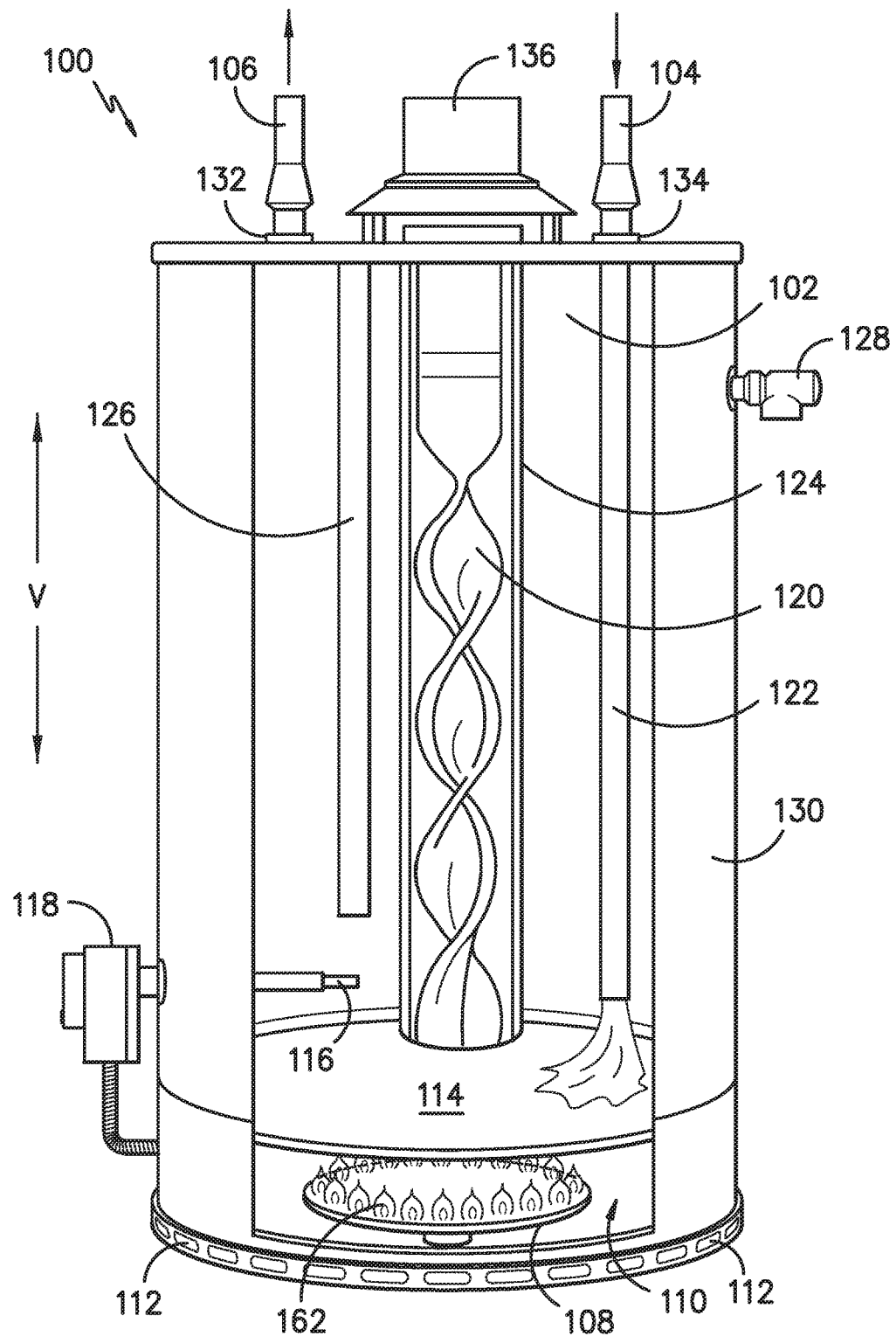
FIG. -1-

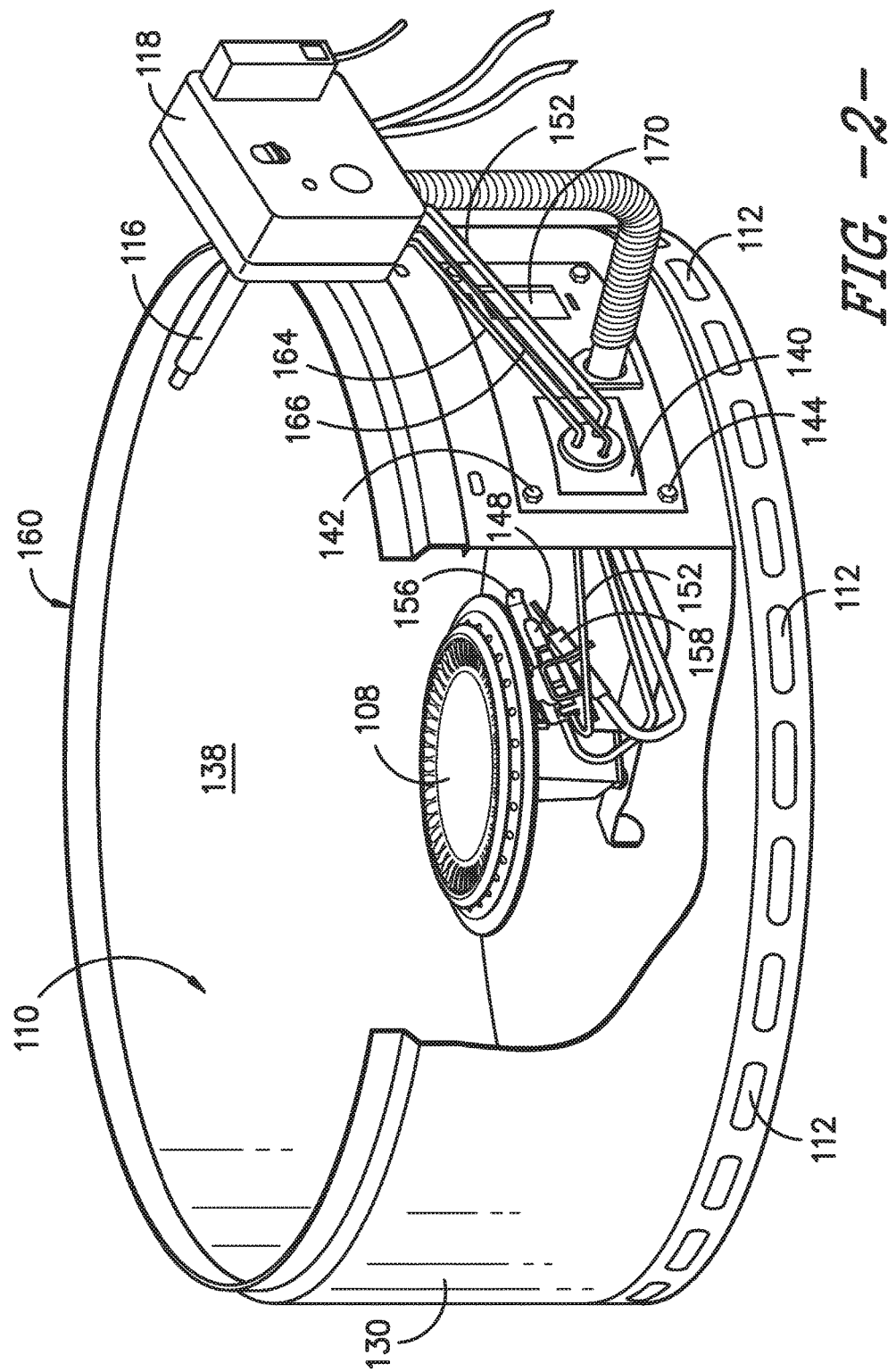
FIG. -2-

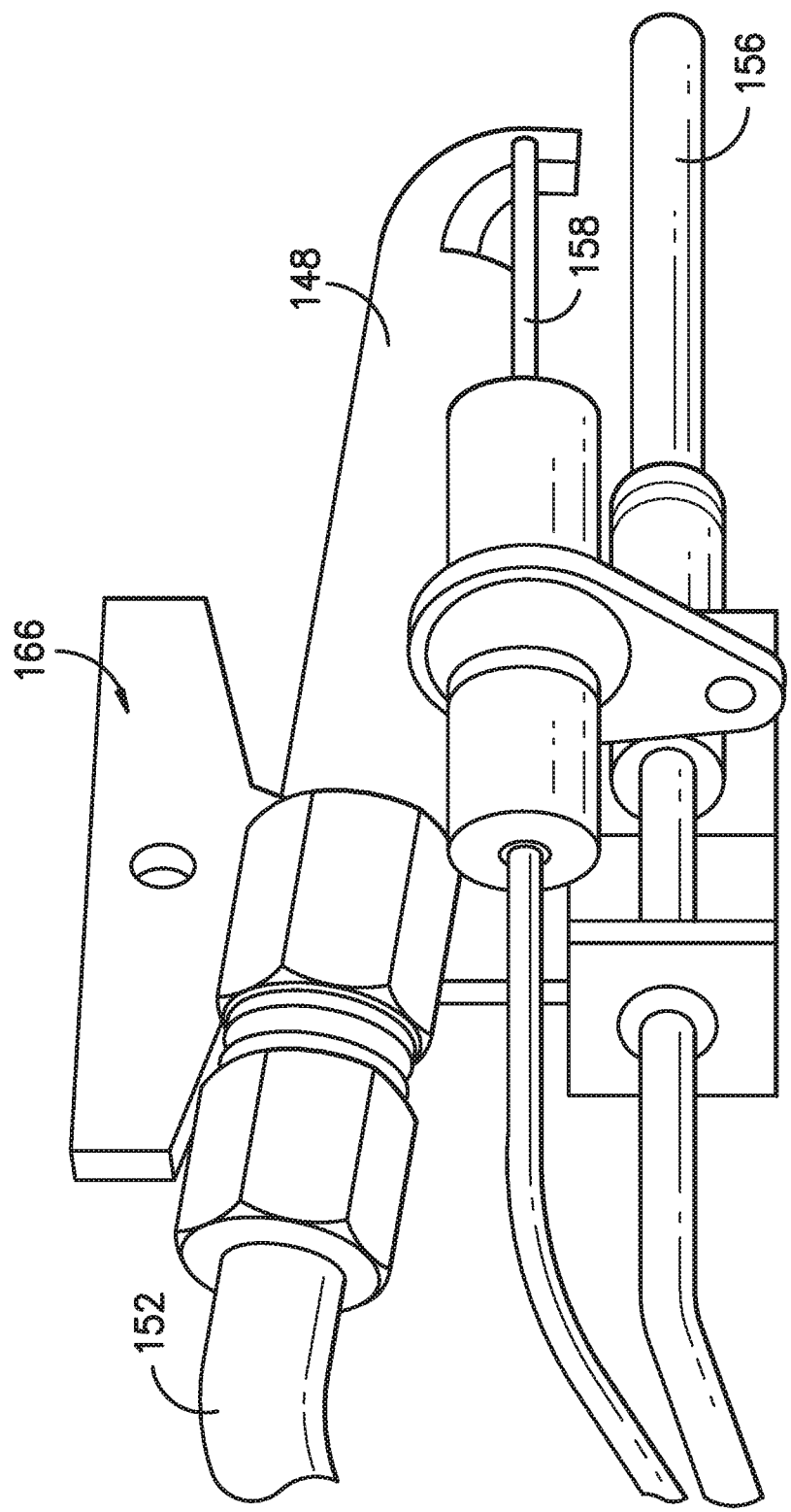
FIG. -3-

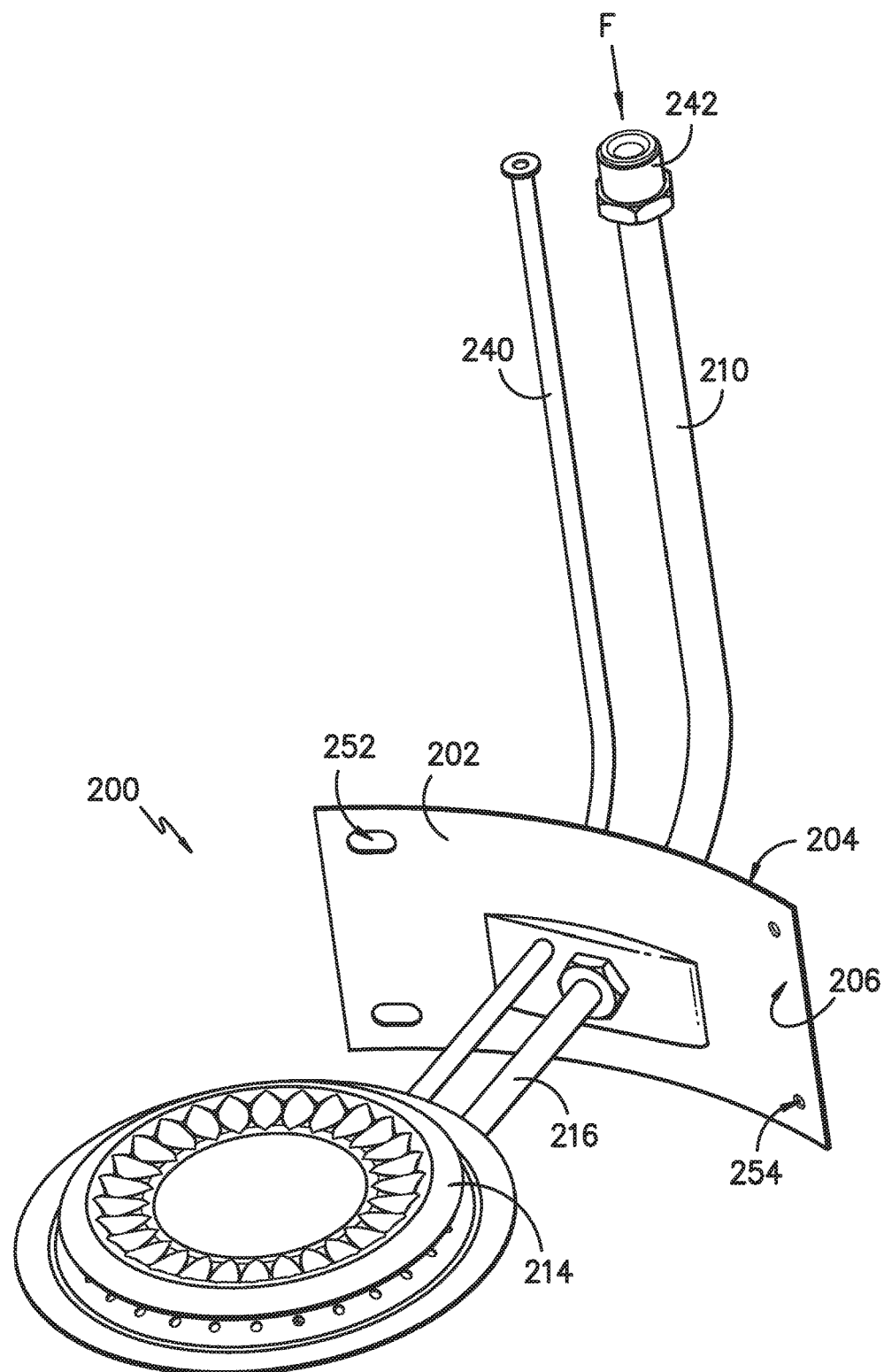
FIG. -4-

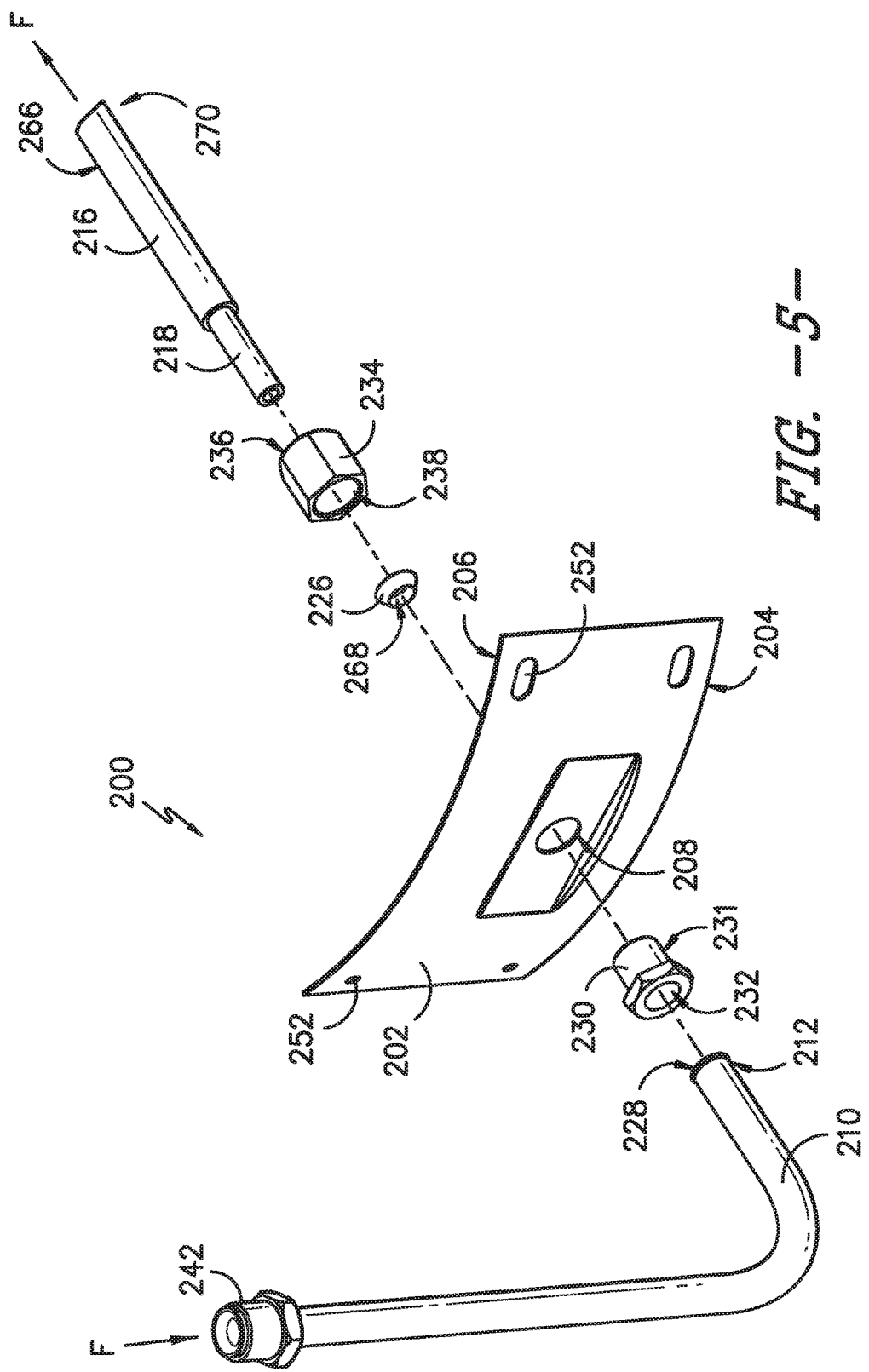
FIG. -5-

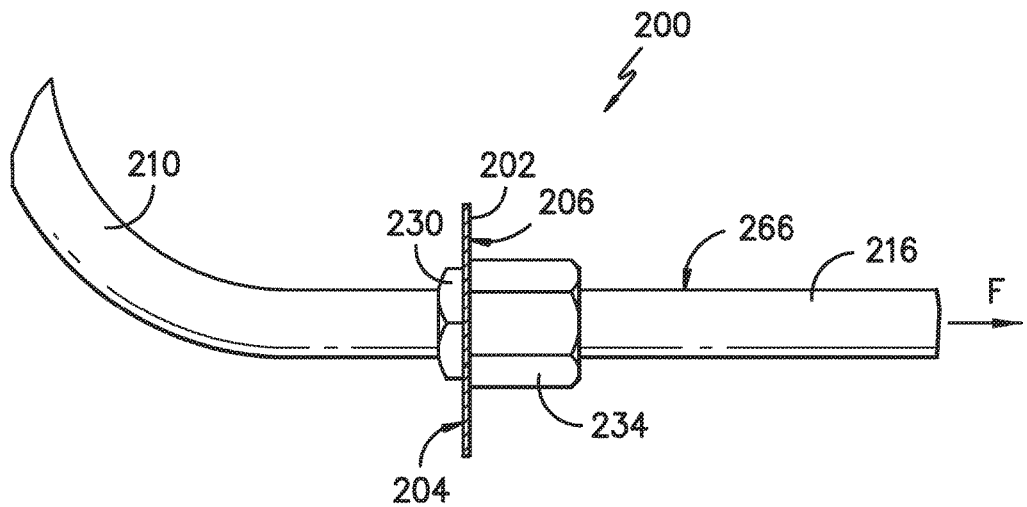
FIG. -6-
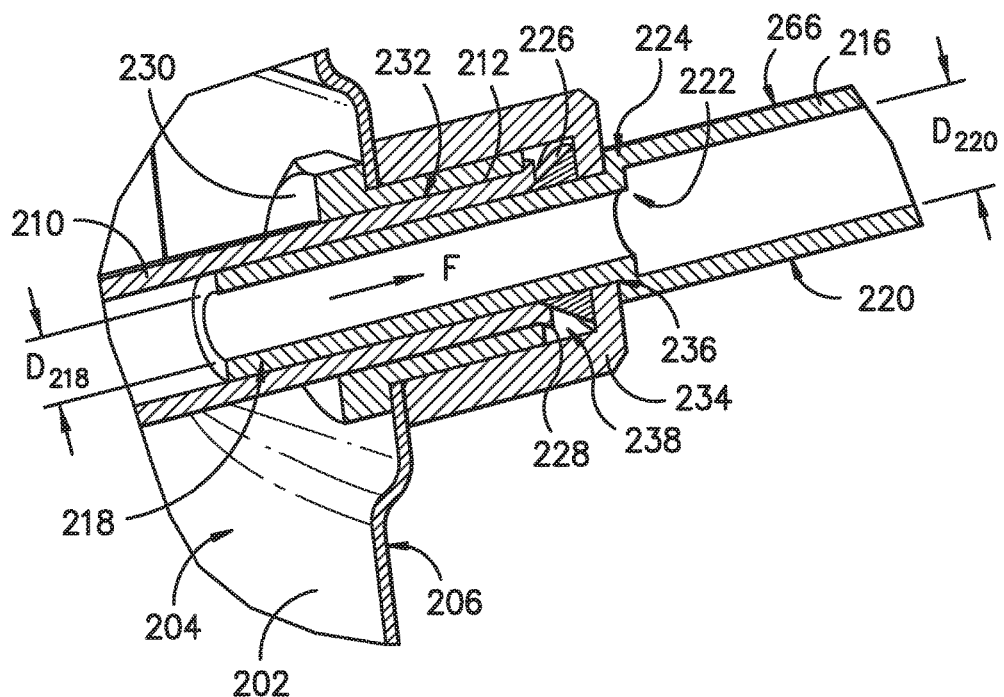
FIG. -7-

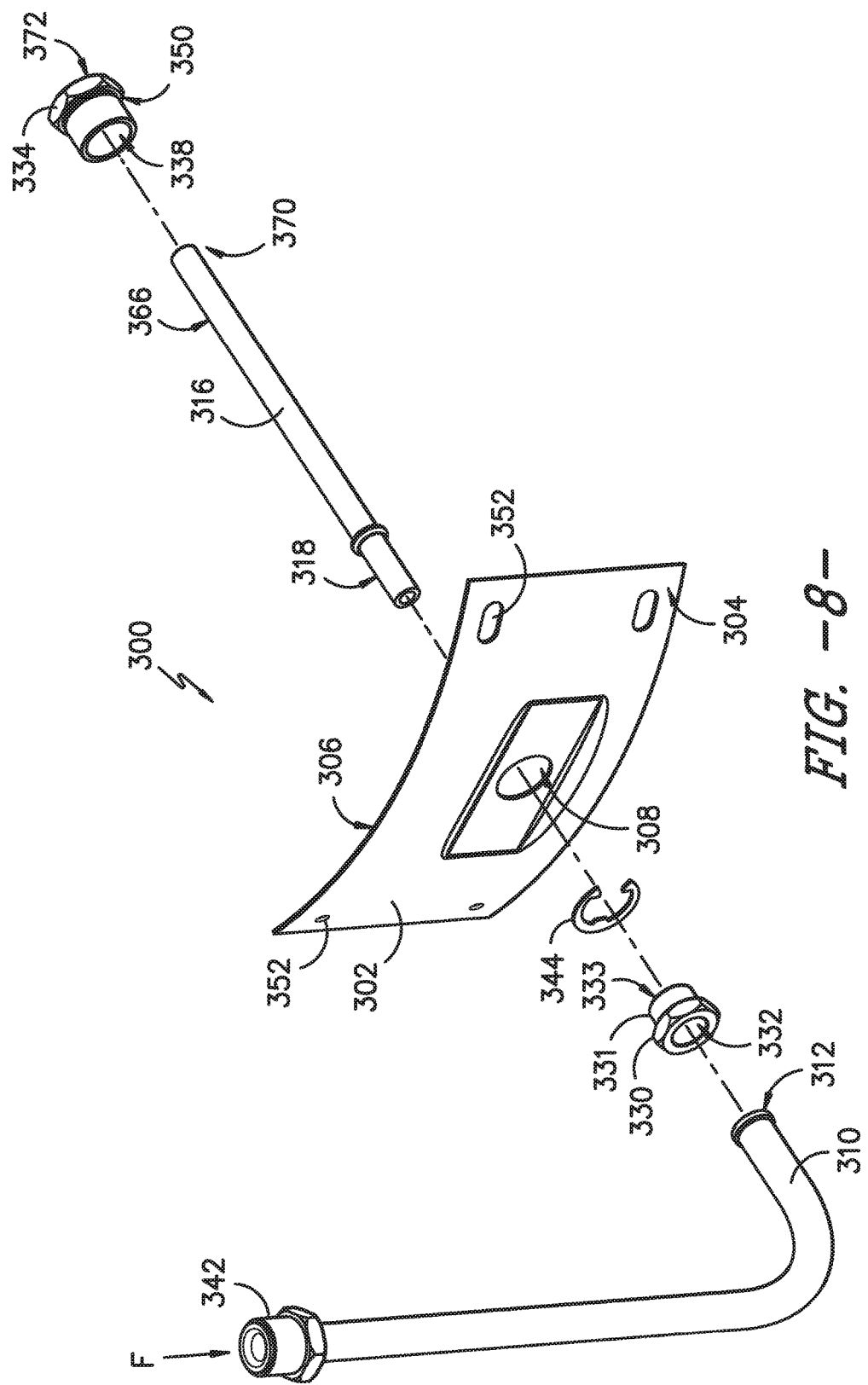
FIG. -8-

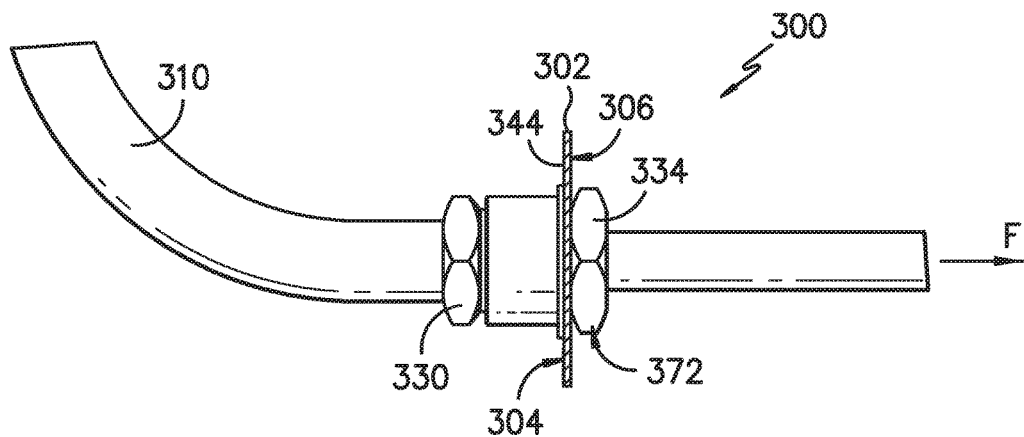
FIG. -9-
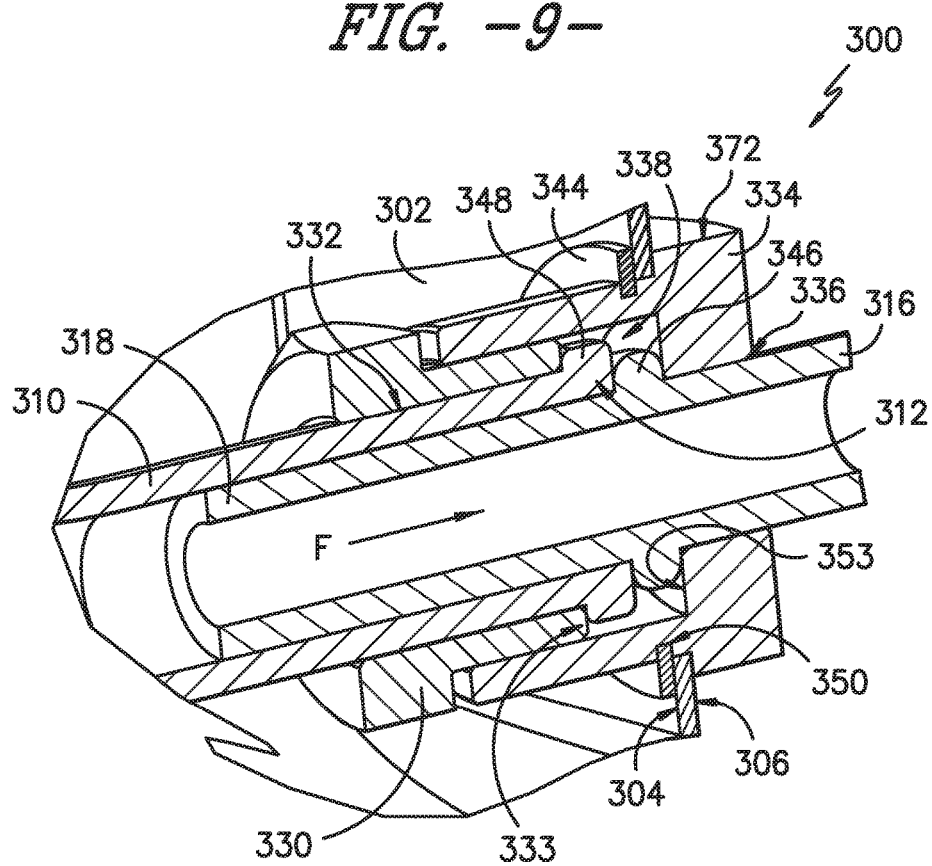
FIG. -10-

GAS FEED TUBE ASSEMBLY FOR A WATER HEATER

FIELD OF THE INVENTION

The subject matter of the present disclosure relates generally to a gas feed tube assembly for supplying gas to a water heater powered by a gaseous fuel.

BACKGROUND OF THE INVENTION

A variety of energy sources are used in creating hot water for commercial and residential use including electric, solar, and various fuels. Natural gas and propane are preferred by some customers due to e.g., the relatively quick heating rate. These fuels are supplied as a gas that is burned in a combustion chamber to provide heat energy to raise the water temperature.

Gaseous fuels are typically supplied to a gas-powered water heater through supply piping connected with e.g., a tank or underground supply line. The supply piping feeds the gas to a location within a structure housing the water heater and is then connected to the water heater. Tubing or other conduit is used to connect with the supply piping to supply the gas to a burner in the combustion chamber of the water heater.

The gas must pass through a wall of the water heater's cabinet or shell to reach the combustion chamber. A seal must be included in order to control the entry of air into the combustion chamber. Various constructions have been proposed for this passage, each having certain disadvantages. In some conventional constructions, crimped or pressed parts are used that require adherence to very close tolerances during manufacturing to provide leak-free connections. Other constructions make use of resilient (e.g., rubber) components that may wear or age over time.

Accordingly, an assembly for connecting a gas water heater with a gas supply would be useful. More particularly, an assembly for a connecting a gas water heater that can be more readily manufactured, facilitates installation of the water heater, and minimize gas leaks would be beneficial.

BRIEF DESCRIPTION OF THE INVENTION

The present invention provides a gas feed tube assembly for a gas fueled water heater and a water heater including such assembly. A pair of gas tubes are connected with one tube received into the other and secured between a pair of complementary fasteners position along a wall or door the water heater. The gas feed tube assembly can be more readily manufactured than certain conventional constructions, facilitates installation of the water heater, provides an air-tight seal, and helps minimize gas leaks. Additional aspects and advantages of the invention will be set forth in part in the following description, or may be apparent from the description, or may be learned through practice of the invention.

In one exemplary embodiment, the present invention provides a gas feed tube assembly for a gas fueled water heater. The assembly includes a wall defining an opening and having an exterior side and an interior side. A first gas tube is positioned on the exterior side of the wall and has a downstream end inserted through the opening of the wall. A second gas tube is positioned on the interior side of the wall and has an upstream end with an upstream end diameter and a main body with a main body diameter. The upstream end diameter is less than the main body diameter. The upstream is inserted through the opening of the wall and into the downstream end of the first gas tube. A pair of complementary fasteners are attached to each other with the wall positioned between at least a portion of the fasteners. The first and second gas tubes are each positioned within both of the complementary fasteners.

In another exemplary embodiment, the present invention provides a gas feed tube assembly for a gas fueled water heater. The assembly includes a wall defining an opening and having an exterior side and an interior side. A first gas tube is positioned on the exterior side of the wall and has a downstream end positioned at the opening of the wall. A second gas tube is positioned on the interior side of the wall and has an upstream end extending through the opening of the wall and into the downstream end of the first gas tube. The upstream end has a rib abutting the downstream end of the first gas tube. A pair of complementary fasteners are positioned at the opening. The first and second gas tubes are each positioned within both of the complementary fasteners. A washer is attached to the upstream end of the second gas tube and is positioned on the exterior side of the wall.

The present invention also includes a water heater having an exemplary gas tube assembly as set forth herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 provides a partially cut away, side view of an exemplary embodiment of a water heater of the present invention.

FIG. 2 provides a perspective view of an exemplary gas combustion chamber as may be used with the exemplary water heater of FIG. 1.

FIG. 3 provides a close-up view of certain exemplary components positioned adjacent to burner of the exemplary water heater of FIGS. 1 and 2.

FIG. 4 provides a perspective view of an exemplary embodiment of a gas feed tube assembly of the present invention.

FIG. 5 is an exploded view of the exemplary assembly of FIG. 4.

FIG. 6 is a side view of the exemplary assembly of FIG. 4.

FIG. 7 is a cross-sectional view of the exemplary assembly of FIG. 4.

FIG. 8 is an exploded view of another exemplary embodiment of a gas feed tube assembly of the present invention.

FIG. 9 is a side view of the exemplary assembly of FIG. 8.

FIG. 10 is a cross-sectional view of the exemplary assembly of FIG. 8.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 illustrates a partial sectional, side view of an exemplary water heater 100 of the present invention. Water heater 100 includes a tank 102 where water is stored and heated. Water is supplied to tank 102 by inlet line 104. Heated water is supplied by tank 102 through outlet line 106. Water heater 100 is fluidly connected with lines 104 and 106 using connections 132 and 134. In turn, lines 104 and 106 connect with the water supply system of e.g., a residence or a commercial structure.

From line 104, water travels into tank 102 through a cold water dip tube 122 that extends along vertical direction V towards the bottom 114 of tank 102. After being heated, water exits tank 102 by travelling vertically upward and out through outlet line 106. Anode rod 126 provides protection against corrosion attacks on tank 102 and other metal components of water heater 100. A pressure relief valve 128 provides for a release of water from tank 102 in the event the pressure rises above a predetermined amount.

Water heater 100 includes a combustion chamber 110 in which a gas burner 108 is centrally located. Gas burner 108 is supplied with a gaseous fuel e.g., propane or natural gas. Air travels into combustion chamber 110 through openings 112 in cabinet 130. The resulting mixture of air and gas is ignited and burned to heat bottom 114 of tank 102 and its water contents. Hot combustion gas 120 exits combustion chamber 110 through a vent or flue 124 centrally located within tank 102. Heat exchange with flue 124 also helps heat water in tank 102. A baffle 120 promotes this heat exchange. Gas 120 exits water heater 100 though vent hood 136, which may be connected with additional vent piping (not shown).

A thermostat 116 measures the temperature of water in tank 102 and provides a signal to gas control valve module 118. As used herein, "a signal" is not limited to a single measurement of temperature and, instead, may include multiple measurements over time or continuous measurements over time. The signal may be provided through e.g., changes in current, voltage, resistance, or others. Depending upon whether the desired temperature has been reached as determined e.g., from the signal from thermostat 116, gas control valve module 118 regulates the flow of gas to burner 108.

Referring now to FIG. 2, combustion chamber 110 is formed by a chamber wall 138 that at least partially encloses combustion chamber 110 and may also provide support for tank 102 along top edge 160. As shown, chamber wall 138 encircles burner 108 and is spaced apart from burner 108. Chamber wall 138 may be part of cabinet 130 (FIG. 1) or may be a separate component.

FIG. 3 provides a close-up view of certain components positioned beneath and directly adjacent to gas burner 108. Water heater 102 includes a pilot burner 148 that provides a pilot light to ignite a mixture of air and fuel at burner 108 when a gas valve (now shown) is open. An igniter 158 is positioned adjacent to pilot burner 148 and generates a spark used to ignite gaseous fuel and provide the pilot light. Gaseous fuel for pilot burner 108 is supplied by pilot burner fuel line 152. Gas valve control module 118 controls the flow of gaseous fuel through pilot burner fuel line 152 and the flow of gas to burner 108 from a gaseous fuel supply. A sight glass 170 allows for observation of a flame at burner 108 during operation.

A thermo-electric device 156 is positioned adjacent to the pilot burner 148 and igniter 158. Thermo-electric device 156 may be a thermopile that can convert heat from pilot burner 148 into electrical energy, which can be used e.g., to power gas valve control module 118. Thermopile 156 may be constructed from e.g., a plurality of thermocouples connected in a series, for example. For this exemplary embodiment, a bracket 166 is used to position pilot burner 148, igniter 158, and thermopile 156 near gas burner 108.

For this exemplary embodiment, water heater 100 includes a door or removable wall 162 secured by a plurality of fasteners 142, 144. The door is 162 removable from cabinet 130 along with an assembly that can include e.g., pilot burner fuel line 152, electrical line 164 for igniter 158, and connectors 166 extending through panel 140 to thermopile 156. The door could also be attached to e.g., chamber wall 138. By removing door 162, combustion chamber 110 can be accessed to e.g., replace burner 108 or other service other parts of this assembly. At the same time, when installed door 162 helps maintain a seal so that air flows into combustion chamber 110 through openings 112.

FIGS. 4, 5, 6, and 7 provide various views of an exemplary gas feed tube assembly 200 of the present invention. Assembly 200 includes a door or wall 202 that can be selectively attached to, or removed from, cabinet 130 or chamber wall 138 using fasteners inserted through openings 252. With reference to combustion chamber 110, wall 202 includes an exterior side 204 and interior side 206.

A first gas tube 210 is positioned on exterior side 204 of wall 202. First gas tube 210 has a downstream end 212 inserted through an opening 208 (FIG. 5) in wall 202. As used herein, "upstream" and "downstream" are with direction to the flow of gaseous fuel F as illustrated in the figures. A second gas tube 216 is positioned on the interior side 206 of wall 202 and has an upstream end 218 having an internal upstream end diameter $D_{218}$ (FIG. 7). Second gas tube 216 also has a main body 220 having an internal, main body diameter $D_{220}$ that is greater than upstream end diameter $D_{218}$. Main body 220 and upstream end 218 meet at a junction 222 that defines an external step 222 on the outer surface 266 of second gas tube 216. Upstream end 218 is positioned through opening 208 of wall 202 and into downstream end 212 of first gas tube 210. In one exemplary embodiment, upstream end has a length in the range of 0.5 inch to 3 inches; other lengths may be used as well.

Assembly 200 includes a pair of complementary fasteners 230 and 234. Wall 202 is positioned between (e.g., sandwiched between) at least a portion of fasteners 230, 234. More particularly, for this exemplary embodiment, male fastener 230 is in contact with first gas tube 210 and defines a channel 232 in which the downstream end 212 of first gas tube 210 is received. Downstream end 212 includes a flare 228 or is flared. Female fastener 234 is in contact with second gas tube 216 and defines an aperture 236 through which upstream end 218 of second gas tube 216 is inserted until external step 224 abuts female fastener 234. A ferrule 226 includes an opening 268 through which upstream end 218 is also inserted. Ferrule 226 is in contact with downstream end 228 of first gas tube 210 and is positioned between downstream end 228 and female fastener 234.

Male fastener 230 includes threads (not shown) on external surface 231 that can be mated in a complementary manner with threads (not shown) in socket 238 of female fastener 234. By applying torque to fasteners 230 and 234, male fastener 230 is secured in socket 238 while securely fixing wall or door 202 between fasteners 230 and 234. At the same time, flare 228 will be forced against a frustoconical surface of ferrule 226 to provide a gas seal.

By way of example, the entire assembly 200 can be installed into water heater 100 as one piece to facilitate manufacturing and service while providing a seal between tubes 210 and 216. Fastener 242 on first gas tube 210 can be used to connect with e.g., piping of a main gas supply. Assembly 200 can be provided with a gas burner 214 attached to a downstream end 270 of second gas tube 216. A pilot burner fuel line 240 can also be provided through door 202 as shown in FIG. 4 or not included as shown in in FIGS. 5, 6, and 7.

FIGS. 8, 9, and 10 provide various view of another exemplary gas feed tube assembly 300 of the present invention. Assembly 300 includes a door or wall 302 that can be selectively attached to, or removed from, cabinet 130 or chamber wall 138 using fasteners inserted through openings 352. With reference to combustion chamber 110, wall 302 includes an exterior side 304 and interior side 306.

A first gas tube 310 is positioned on exterior side 304 of wall 302. First gas tube 310 has a downstream end 312 positioned at opening 308 (FIG. 10) of wall 302. A second gas tube 316 is positioned on the interior side 306 of wall 302 and has an upstream end 318 extending through opening 308 and into the downstream end 312 of first gas tube 310. Upstream end 318 includes a rib 346 that abuts the downstream end 312 of first gas tube 310.

Assembly 300 includes a pair of complementary fasteners 330 and 334. For this exemplary embodiment, male fastener 330 is in contact with first gas tube 310 and defines a channel 332 in which the downstream end 312 of first gas tube 310 is received. Downstream end 312 includes a lip 348 that abuts rib 346 (FIG. 10).

Female fastener 334 is in contact with second gas tube 316 and defines an aperture 336 (FIG. 10) through second gas tube 316 extends. Female fastener 334 also defines a socket 338 into which the rib 346 of upstream end 318 is received and abuts female fastener 334 along one side (with reference to the direction of gas flow F). Lip 348 of downstream end 212 abuts rib 346 along an opposing side such that rib 346 is pressed or sandwiched between female fastener 334 and lip 348 and contacts both.

Male fastener 330 includes threads (not shown) on external surface 331 (FIG. 8) that can be mated in a complementary manner with threads (not shown) in socket 338 of female fastener 334. By applying torque to fasteners 330 and 334, male fastener 330 is secured in socket 338 while securely fixing lip 348 and rib 346 between fasteners 330 and 334. More particularly, the downstream tip 333 of male fastener 330 forces lip 348 against rib 346, which contacts the rear wall 353 (FIG. 10) in socket 338.

A washer or C-ring 344 is clipped into a groove 350 on female fastener 334 along exterior side 302 after fastener 334 is positioned in opening 308. Wall 302 is thereby secured between C-ring 344 and crown 372 of female fastener 334, which prevents movement of assembly 300 relative to wall 302. C-ring 344 can be readily inserted into, or removed from, groove 350.

As with assembly 200, the entire assembly 300 can be installed into water heater 100 as one piece to facilitate manufacturing and service while providing a seal between tubes 310 and 316. Fastener 342 on first gas tube 310 can be used to connect with e.g., piping of a main gas supply. Assembly 300 can be provided with a gas burner attached to a downstream end 370 of second gas tube 316. A pilot burner fuel line can also be provided through door 302.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas feed tube assembly for a gas fueled water heater, comprising:
   a wall defining an opening and having an exterior side and an interior side;
   a first gas tube positioned on the exterior side of the wall and having a downstream end inserted through the opening of the wall;
   a second gas tube positioned on the interior side of the wall and having an upstream end with an upstream end diameter and a main body with a main body diameter, the upstream end diameter less than the main body diameter, the upstream end inserted through the opening of the wall and into the downstream end of the first gas tube; and
   a pair of complementary fasteners attached to each other with the wall positioned between at least a portion of the fasteners, wherein the first and second gas tubes are each positioned within both of the complementary fasteners.

2. The gas feed tube assembly as in claim 1, wherein the main body and upstream end of the second gas tube meet at a junction that defines an external step.

3. The gas feed tube assembly as in claim 2, wherein the external step abuts one of the complementary fasteners.

4. The gas feed tube assembly as in claim 1, further comprising a ferrule received onto the upstream end of the second gas tube, the ferrule in contact with, and positioned between the downstream end of the first gas tube and one of complementary fasteners.

5. The gas feed tube assembly as in claim 1, further comprising a gaseous fuel burner attached to a downstream end of the second gas tube.

6. The gas feed tube assembly as in claim 1, further comprising a door plate that includes the wall, the door plate configured for selective installation and removal from the gas fueled water heater.

7. The gas feed tube assembly as in claim 1, wherein one of the complementary fasteners comprises:
   a male fastener in contact with the first gas tube and defining a channel into which the downstream end of the first gas tube is inserted.

8. The gas feed tube assembly as in claim 7, wherein one of the complementary fasteners comprises:
   a female fastener in contact with the male fastener and defining an aperture through which the upstream end of the second gas tube is inserted.

9. The gas feed tube assembly as in claim 8, wherein the downstream end of the first gas tube is flared.

10. The gas feed tube assembly as in claim 9, further comprising a gaseous fuel burner attached to a downstream end of the second gas tube.

11. A gas feed tube assembly for a gas fueled water heater, comprising:
   a wall defining an opening and having an exterior side and an interior side;
   a first gas tube positioned on the exterior side of the wall and having a downstream end positioned at the opening of the wall;
   a second gas tube positioned on the interior side of the wall and having an upstream end extending through the opening of the wall and into the downstream end of the first gas tube, the upstream end having a rib abutting the downstream end of the first gas tube;
   a pair of complementary fasteners positioned at the opening, wherein the first and second gas tubes are each positioned within both of the complementary fasteners; and
   a washer attached to the upstream end of the second gas tube and positioned on the exterior side of the wall.

12. The gas feed tube assembly as in claim 11, wherein one of the pair of complementary fasteners also abuts the rib of the second gas tube.

13. The gas feed tube assembly as in claim 11, wherein in the downstream end of the first gas tube defines lip that abuts the rib of the second gas tube.

14. The gas feed tube assembly as in claim 11, wherein the lip of the first gas tube and the rib of the second gas tube are positioned between the pair of complementary fasteners.

15. The gas feed tube assembly as in claim 14, further comprising a gaseous fuel burner attached to a downstream end of the second gas tube.

16. The gas feed tube assembly as in claim 11, further comprising a door plate that includes the wall, the door plate configured for selectively installation and removal from the gas fueled water heater.

17. The gas feed tube assembly as in claim 11, wherein one of the complementary fasteners comprises:
   a male fastener in contact with the first gas tube and defining a channel into which the downstream end of the first gas tube is inserted.

18. The gas feed tube assembly as in claim 17, wherein one of the complementary fasteners comprises:
   a female fastener in having a cavity in receipt of the male fastener and defining an aperture through which the second gas tube extends.

19. The gas feed tube assembly as in claim 18, further comprising a gaseous fuel burner attached to a downstream end of the second gas tube.

20. A gas fueled water heater comprising the wall assembly of claim 19.

* * * * *